Oct. 30, 1934.  J. F. DONNELLY  1,978,992
COMBINED FLUID CONTROLLING AND TEMPERATURE MEASURING DEVICE
Filed April 6, 1929
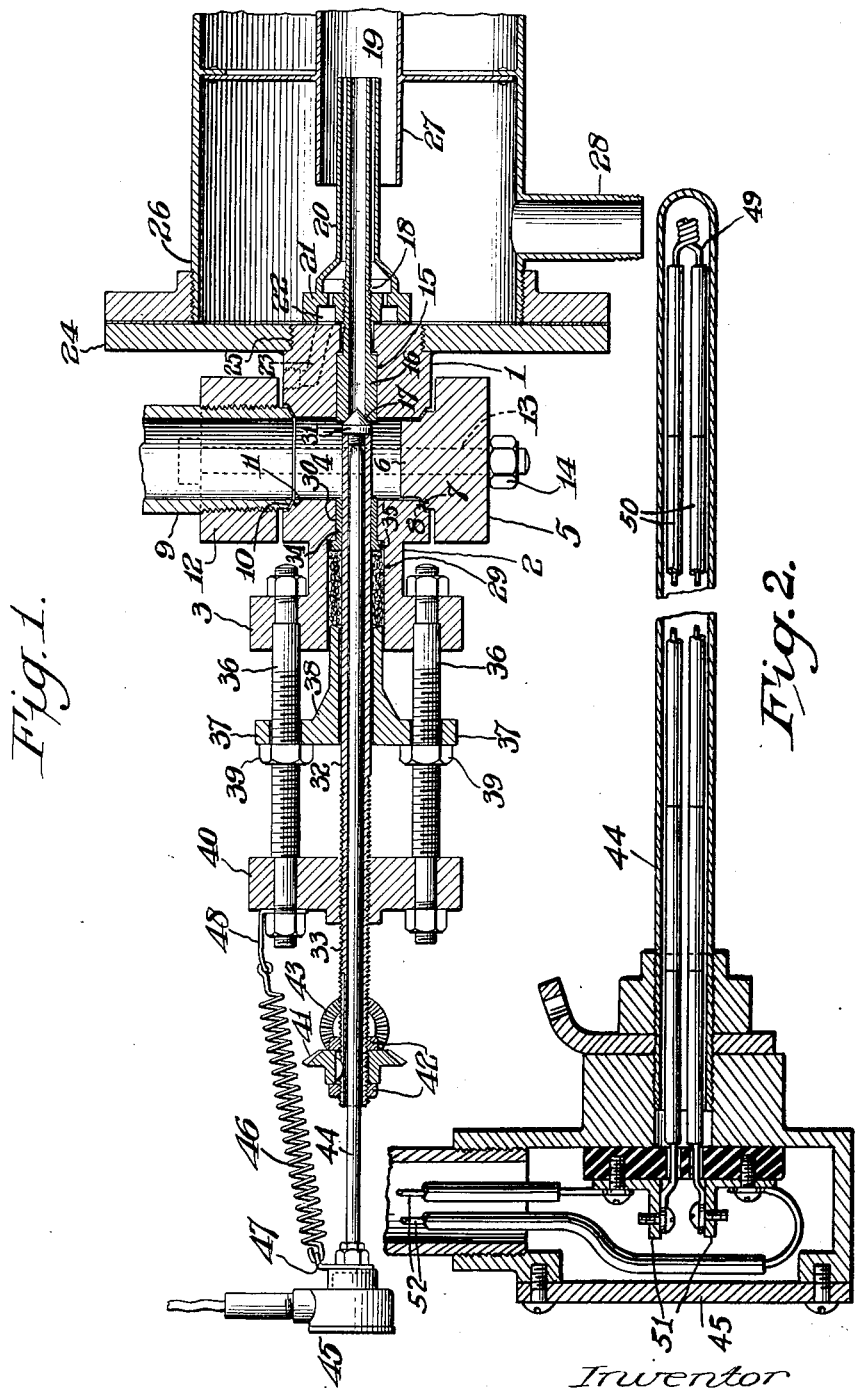
Inventor
Joseph F. Donnelly
By Laurence S. Paddock
Atty.
Witness
A. B. Davison.

Patented Oct. 30, 1934

1,978,992

UNITED STATES PATENT OFFICE 1,978,992

COMBINED FLUID CONTROLLING AND TEMPERATURE MEASURING DEVICE

Joseph F. Donnelly, Lemont, Ill., assignor to Donnelly Process Corporation, Chicago, Ill., a corporation of Nevada Application April 6, 1929, Serial No. 353,242

5 Claims. (Cl. 137—111)

This invention relates to a fluid controlling device and temperature measuring instrument combined therewith so as to both control the passage of fluid through said controlling device and measure the temperature of said fluid as it passes therethrough.

The specific embodiment of my invention herein disclosed illustrates the temperature measuring instrument combined with a fluid controlling device of the type disclosed in my Patent #1,619,335 issued March 1st, 1927. It will be understood however that my invention contemplates the use of other fluid controlling means than that of said patent.

It is well known that where a temperature measuring device such as a thermo-couple is used to measure the temperature of hydrocarbon oil undergoing a cracking reaction wherein free carbon is being formed that the wall or housing which surrounds said device or thermo-couple, soon becomes covered with a deposit of carbon where free carbon has been formed in said oil, or where free carbon has not been formed in the general cracking reaction a deposit of carbon may be formed thereon due to local overheating when the oil remains in contact with the highly heated housing of the thermo-couple for an excessive period of time. This formation of free carbon by local overheating may also take place in addition to free carbon formation in the general reaction in processes where such is the case. The housing of the thermo-couple is also liable to become coated with ferric sulphide which is formed by the action of sulphur on the iron walls of the cracking chamber. This coating of carbon or ferric sulphide has a heat insulating effect which greatly impairs the transference of heat to the temperature responsive elements of the thermo-couple and seriously interferes with the accurate measurement of the temperature of the hot oil.

An object of this invention is to eliminate this objectionable deposition and place the temperature responsive element of the temperature measuring device in intimate heat exchanging relation with the hot oil in such a manner as to effect a quick and accurate temperature measurement.

A further object is to place the temperature responsive element of the temperature measuring device in heat interchanging relation with the stream of hot oil passing through the controlling device whereby deposition of detrimental heat insulating material such as free carbon or ferric sulphide on the controlling device is prevented and the hot oil is not allowed to remain in contact with the highly heated housing of said measuring device for such a length of time as to cause free carbon formation by local overheating.

Figure 1 of the drawing shows a longitudinal cross section of the fluid controlling device with the heat measuring instrument carried thereby. Figure 2 is a longitudinal cross section of the thermo-couple.

In the drawing 1 is the body of the fluid controlling device or valve which has an extension 2 thereon formed at its outer end a flange 3. The body 1 has a central chamber 4 preferably formed by a transverse bore extending through the same. One of the open ends of said chamber or bore 4 is closed by a flanged member 5 having a projection 6 thereon and an annular seat 7 mating with a seat 8 on the body so as to form a fluid tight contact therewith when held in closed position. A gasket may be interposed between the seats 7 and 8 as shown. A pipe 9 is fitted in the other open end of said bore in such a manner that the end of the pipe which is formed with annular seat 10 is caused to make a fluid tight contact with an annular seat 11 on said body. A gasket may be interposed between the seats 10 and 11 as shown. The pipe 9 is threaded through a flange 12. The flanges 5 and 12 are connected by a pair of bolts 13, one of which is shown in Figure 1.

The bolts 13 have nuts 14 thereon by which means the flanges 5 and 12 may be drawn inwardly toward each other thus causing the seats 7 and 10 to be firmly held against the seats 8 and 11.

The body 1 is provided with an axial bore forming a passage in which is inserted a removable tubular member 16, preferably of tempered steel, having its inner end formed so as to provide a valve seat at 17 and its outer end formed so as to provide a threaded extension 18 which extends outwardly beyond the end of the body member 1 and forms a nozzle terminating in an expansion chamber 19. Surrounding the extension or nozzle 18 and spaced therefrom as shown in the drawing is a jacket 20. The jacket 20 is provided with a head 21 having an annular groove 22 therein and a threaded center adapted to screw onto the threaded portion of the extension 18. When the head 21 is screwed tight against the body member 1 the groove 22 is closed forming a chamber. This chamber is adapted to be supplied with steam through a passage 23. The steam finds its way through passages as shown into the annular space between the extension 18 and the jacket 20 and discharges into the expansion chamber 19. The body member 1 has a reduced portion which is threaded into a flange 24 at 25. The flange 24 carries a flanged jacket 26 which in turn carries a tubular receptacle 27 the interior of which comprises the expansion chamber 19. The jacket 26 is provided with an inlet 28 for oil or other cooling medium which is drawn into the expansion chamber 19 by the injector action of the oil discharging from the extension 18.

The body member 1 is provided with an axial bore forming a passage 29 through the extension tube and having a reduced portion 30 at the inner end thereof. Through the bore 29 is inserted a valve having a head 31 and a hollow stem 32 threaded at its outer end 33. A bushing 34 is inserted in the reduced portion 30 of the bore 29 through which the stem 32 passes. The bushing 34 is provided with a flange 35 which seats against the outer end of the reduced portion 30.

Mounted on the flange 3 are threaded pillar posts 36. The pillar posts 36 pass through a flange 37 which carries a compression gland 38 through which the stem 32 passes. The compression gland 38 passes into the bore 29 wherein a packing is placed between the inner end of said gland and the flange 35 on the bushing 34. Nuts 39 are threaded on pillar posts 36 above the flange 37. By rotation of the nuts 39 the gland 38 may be advanced so as to compress said packing and form a fluid tight seal around the stem 32 within the bore 29.

A detachable head block 40 is mounted on the outer end of said pillar posts through which is threaded the end 33 of the stem 32. By this construction a rotation of the stem 32 will cause a longitudinal adjustment of the valve head 31 with respect to the seat 17. The outer end of the stem 32 is provided with a bevel gear 41 which is keyed to the stem 32 and held in longitudinal position thereon by nuts 42 on the threaded portion 33 of the stem 32. The bevel gear 41 is driven by a bevel gear 43 which is mounted on a shaft (not shown) which leads to a distant point where it is rotated by the operator. The gear 43 is mounted in a suitable frame (not shown) which is attached to and moves with the stem 32 which assures the constant mesh and alignment of the gears 41 and 43. The shaft which operates the gear 43 is so mounted as to rotate the gear 43 and at the same time permit the necessary lateral movement of said gear.

The protective tube 44 of a thermo-couple 45 is inserted into the center of the hollow stem 32. The inner end of said protective tube bears against the valve head 31 thus bringing a portion of the protective tube within the chamber 4. The protective tube of thermo-couple 45 is resiliently held in position by a spring 46 which is hooked between a strap 47 attached to the thermo-couple 45 and a strap 48 attached to the head block 40. By this construction the thermo-couple with its protective tube 44 may partake of the longitudinal motion of the stem 32 and also be held in proper position both in longitudinal relation to the stem 32 and against rotary motion relative to said stem. When desired the thermo-couple may be removed from stem 32 by unhooking the spring 46 from the strap 47.

It will be seen that the portion of the stem 32 which lies within the chamber 4 and which carries the end of the protective tube 44 of the thermo-couple 45 in which tube are located the temperature responsive metals 49 of the thermo-couple, is in direct contact with the hot oil passing through the chamber 4. As shown in Fig. 2 the temperature responsive metals 49 pass through insulating tubes 50 which lie within the protective tube 44 and in the present instance are composed of wires which are twisted together at their outer ends and are attached at their inner ends to electrically conductive terminals 51. Electrically conductive wires 52 are attached to terminals 51 and lead to a temperature indicating or measuring means such as a pyrometer (not shown). Due to the high velocity of the oil through the chamber 4 any free carbon which may be carried by the oil will not deposit on the stem 32, which is likewise true of any other objectionable material such as ferric sulphide. The high velocity of the oil will also prevent the oil from remaining in contact with the highly heated stem 32 for sufficient time to cause local overheating with the consequent formation of free carbon which would attach itself to said stem. The thermocouple 45 forms the temperature responsive element of a pyrometer. The thermocouple will therefore always be in efficient and quick heat transferring relation to the hot oil passing through the chamber 4 and with its associated elements forming the pyrometer will give a true, accurate and uniform indication or measurement of the temperature of said hot oil.

While the valve structure and associated mechanism herein disclosed is particularly adapted for use in the type of apparatus disclosed in my copending applications Serial #104,364 filed April 24, 1926 and #104,365 filed April 24, 1926, it is to be understood that my invention includes within its scope the employment of other mechanism adapted to carry out the principles thereof.

Having described my invention what I claim is;

1. A device for controlling the flow of hydrocarbon oil at a cracking temperature having a body portion and a fluid controlling valve having a hollow stem projecting into the passage for the flowing oil, said body portion and stem being so constructed with respect to each other that said oil is adapted to flow over the inner end of said stem with a sweeping action at such high velocity as to prevent heat insulating products of said cracking reaction from adhering to said stem, a tubular rod having a portion thereof containing a thermo-couple adapted to actuate a temperature indicating device located in said hollow stem and a portion thereof projecting to a point without said stem and a spring connected to said rod and valve body portion adapted to resiliently hold the thermo-couple containing portion of said rod within said stem.

2. A device for controlling the flow of hydrocarbon oil at a cracking temperature having a body portion and a fluid controlling valve having a hollow stem projecting into the passage for the flowing oil, said body portion and stem being so constructed with respect to each other that said oil is adapted to flow over the inner end of said stem with a sweeping action at such high velocity as to prevent heat insulating products of said cracking reaction from adhering to said stem, a tubular rod containing a temperature responsive device located in said hollow stem and adapted to actuate a temperature measuring device, means for imparting longitudinal motion to said valve and stem and resilient means for holding said rod in position in said stem so constructed that longitudinal motion of said rod is permitted concurrently with the longitudinal motion of said stem.

3. A device for controlling the flow of hydrocarbon oil at a cracking temperature having a body portion and a fluid controlling valve having a hollow stem projecting into the passage for the flowing oil, said body portion and stem being so constructed with respect to each other that said oil is adapted to flow over the inner end of said stem with a sweeping action at such high velocity as to prevent heat insulating products of the cracking reaction from adhering to said stem, a tubular rod containing a temperature responsive device located in said hollow stem and adapted to actuate a temperature measuring device, means for imparting longitudinal motion to said valve and stem by rotary motion of said stem and resilient means for holding said rod in position in said hollow stem so constructed that longitudinal motion of said rod is permitted concurrently with the longitudinal motion of said stem without rotary motion of said rod relative to said stem.

4. A valve for controlling the flow of hydrocarbon oil at a cracking temperature having a body portion and a fluid controlling portion projecting into the passage for the flowing oil, said body portion and fluid controlling portion being so constructed with respect to each other that said oil is adapted to flow over said fluid controlling portion at such high velocity as to prevent heat insulating products of the cracking reaction from adhering to said projecting portion and a temperature responsive means adapted to actuate a temperature indicating means, said temperature responsive means being positioned within said projecting portion and having a portion adapted to be surrounded by said flowing oil and protected therefrom by said projecting portion.

5. A valve for controlling the flow of hydrocarbon oil at a cracking temperature having a body portion and a fluid controlling hollow stem projecting into the passage for the flowing oil, said body portion and stem being so constructed with respect to each other that said oil is adapted to flow over the inner end of said stem with a sweeping action at such high velocity as to prevent heat insulating products of the cracking reaction from adhering to said stem and a temperature responsive device adapted to actuate a temperature indicating device, said temperature responsive device being removably located within said hollow stem and having a portion adapted to be surrounded by said flowing oil and protected therefrom by said inner end of the stem.

JOSEPH F. DONNELLY.